United States Patent [19]

Kang

[11] 3,993,855

[45] Nov. 23, 1976

[54] SELECTIVE HYDROGENATION OF UNSATURATED HYDROCARBON POLYMERS

[75] Inventor: Jung Wong Kang, Clinton, Ohio

[73] Assignee: The Firestone Tire & Rubber Company, Akron, Ohio

[22] Filed: Aug. 29, 1975

[21] Appl. No.: 608,938

[52] U.S. Cl. ................................ 526/25; 526/20; 526/21; 526/27
[51] Int. Cl.² ............................................ C08F 8/04
[58] Field of Search ......... 260/94.7 H, 96 HY, 82.1, 260/85.1; 450/613.5; 526/25, 27, 20, 21

[56] References Cited
UNITED STATES PATENTS

| | | |
|---|---|---|
| 3,076,858 | 2/1963 | Frevel et al. ............... 260/94.7 H X |
| 3,330,875 | 7/1967 | Cull et al. ................ 260/94.7 H UX |
| 3,366,646 | 1/1968 | Dewhirst ................ 260/94.7 H UX |
| 3,454,644 | 7/1969 | Dewhirst ............................ 260/879 |
| 3,809,687 | 5/1974 | Allison et al. ............... 260/96 HY X |

Primary Examiner—William F. Hamrock

[57] ABSTRACT

Selective hydrogenation of unsaturated hydrocarbon polymers is achieved utilizing compounds of rhodium, ruthenium and iridium in the presence of hydrogen. The hydrogenation is largely selective with respect to external or pendant points of unsaturation on the polymer resin. The invention is particularly pertinent with respect to polymers made from dienes such as butadiene, isoprene, styrene-butadiene and the like which are utilized in the manufacture of rubber compounds.

19 Claims, No Drawings

SELECTIVE HYDROGENATION OF UNSATURATED HYDROCARBON POLYMERS

BACKGROUND OF THE INVENTION

The present invention relates to the selective hydrogenation of unsaturated hydrocarbon polymers. More specifically, the present invention relates to the use of specific catalytic compounds to hydrolyze pendant or external points of unsaturation on hydrocarbon polymers made from polyunsaturated monomers such as dienes and trienes.

Heretofore, various catalysts such as triphenylphosphine complexes of rhodium, ruthenium, and iridium have been prepared, see Journal of the Chemical Society [A] 1968 Page 2665–2670 and 3143–3150; Journal of the Chemical Society [A] 1969, Page 2610–2615. Generally, the various triphenylphospine compounds have been shown to be efficient catalysts including the homogeneous hydrogenation of 1-alkenes.

According to the present invention, it has been found that when certain complexes of rhodium, ruthenium and iridium are utilized in the hydrogenation of unsaturated polymers, that the hydrogenation is unexpectedly selective in contrast to various conventional nickel and cobalt complex hydrogenation catalysts which show very little, if any, selectivity.

SUMMARY OF THE INVENTION

It is an object of the present invention to provide selective hydrogenation of unsaturated hydrocarbon polymers.

It is another object of the present invention to provide selective hydrogenation of unsaturated hydrocarbon polymers, as above, wherein external or pendant points of unsaturation are largely hydrogenated.

It is a further object of the present invention to provide selective hydrogenation of unsaturated hydrocarbon polymers, as above, wherein catalytic compounds of rhodium, ruthenium, and iridium are utilized.

It is still another object of the present invention to provide selective hydrogenation of unsaturated hydrocarbon polymers, as above, wherein specific catalysts utilized are RhHCO[Pphenyl$_3$]$_3$ and RuHCl[Pphenyl$_3$]$_3$.

It is yet a further object of the present invention to provide selective hydrogenation of unsaturated hydrocarbon polymers, as above, wherein the unsaturated polymers are made from unsaturated monomers such as polyalkenes, for example, dienes, alkynes and polyalkynes or copolymers thereof.

It is yet a further object of the present invention to provide selective hydrogenation of unsaturated hydrocarbon polymers, as above, wherein the unsaturated polymers are made from dienes utilized in the production of rubbers.

It is yet a further object of the present invention to provide selective hydrogenation of unsaturated hydrocarbon polymers as above, wherein the hydrogenation is carried out at ambient temperatures.

It is yet a further object of the present invention to provide selective hydrogenation of unsaturated hydrocarbon rubbers, as above, wherein such selectively hydrogenated polymers have improved ozone resistance and improved oxidative stability.

These and other objects of the present invention will become apparent from the following specification which describes in detail various embodiments without attempting to discuss all of the modifications in which the invention might be embodied; the invention being measured by the appended claims and not by the details of the specification.

In general, a process for the selective hydrogenation of unsaturated hydrocarbon polymers, comprising the steps of;

adding an unsaturated hydrocarbon polymer to a vessel, adding hydrogen to said vessel, adding from about 0.5 to about 10.0 millimoles per 100 grams of said polymer of a catalytic compound selected from the class consisting of rhodium, ruthenium and iridium, and hydrogenating said polymer so that largely external points of polymer unsaturation are selectively saturated.

PREFERRED EMBODIMENTS

According to the concepts of the present invention, various catalysts have been found to unexpectantly and selectively hydrogenate unsaturated hydrocarbon polymers. More specifically, the selective hydrogenation relates to the external unsaturated groups of the hydrocarbon polymer. That is, groups or side chains of a polymer which are not part of the backbone and contain a vinyl group, a vinylene group or other site of unsaturation. Thus considering a specific example such as polybutadiene, the amount of 1,2 content of the polymers is reduced thus yielding a higher 1,4 percentage.

The polymers which are selectively hydrogenated are unsaturated hydrocarbon polymers. These compounds are generally made from polyunsaturated monomers containing from 3 to about 12 carbon atoms. Thus, the monomers may be dienes, or alkynes including dialkynes or polyalkynes. Preferred unsaturated hydrocarbon monomers contained from 3 to about 8 carbon atoms and preferably from 3 to 5 carbon atoms.

Examples of specific diene include propadiene, 1,3-butadiene, isoprene (2-methyl-1,3-butadiene), 2,3 dimethyl-1, 1,3-butadiene and phenyl-1,3-butadiene, pentadiene such as piperylene (1,4-pentadiene)and 2-methyl-1,3-pentadiene, hexadiene such as 1,5-hexadiene and 3,4-dimethyl-1,5-hexadiene, heptadiene such as 1,5-heptadiene, octadiene such as 1,4-octadiene, 4,5-diethyl-1,3-octadiene and 3-butyl-1,3-octadiene, and the like. Additionally, unsaturated copolymers made from dienes can be utilized such as butadiene-isoprene, butadiene-propylene, isoprenestyrene, butadiene-ethylene, alpha methyl styrene-butadiene, and styrene-butadiene. Preferred unsaturated hydrocarbon polymers of the present invention include butadiene-isoprene copolymer, butadiene-propylene copolymer, butadiene-ethylene copolymer, isoprenestyrene copolymer, styrene-butadiene copolymer and polymers made from propadiene monomers, polymers made from butadiene monomers such as 1,3-butadiene and isoprene and polymers made from pentadiene such as 1,4-pentadiene.

Additionally, examples of specific alkynes which may be utilized to form polymers include acetylene, 1,5-hexadiyne and 2,4-hexadiyne.

Highly preferred polymers generally include those utilized in the making of rubbers such as from isoprene monomers, 1,3-butadiene monomers thus giving polymers having 1,2 and 1,4-butadiene groups, and various copolymers such as styrene-butadiene. Generally, polymers having high molecular weights are desirable as from about 1,000 to about 500,000 with a preferred range of from about 100,000 to about 150,000.

According to the present invention, it has been found that various compounds of specific catalysts will cause selective hydrogenation of the above-noted polymers at external or non-backbone unsaturated sites. Specific catalysts include rhodium, ruthenium and iridium. The compounds of rhodium and ruthenium are preferred with rhodium being highly preferred. Ruthenium tends to be affected by moisture and hence care must be taken to expel the moisture or active hydrogen compounds from the reaction vessel as by purging with nitrogen or other inert atmosphere before adding any quantities of the ruthenium compounds.

In general, based upon 100 grams of polymer, from about 0.5 to about 10.0 millimoles of the catalytic compound may be utilized. A more desirable range is from about 0.75 to about 1.75 with a highly preferred range being approximately 1.0 millimoles. Specific examples of catalytic compounds include $RhCl[PPh_3]_3$ and $RhClCO[PPh_3]_2$ while preferred catalysts include $IrH_3[PPh_3]_3$ and highly preferred compounds include $RhHCO[PPh_3]_3$ and $RuHCl[PPh_3]_3$ where Ph, of course is a phenyl group. General examples of catalytic compounds include compounds having the formula $RhCl[PR_3]_3$, $RhClCO[PR_3]_2$, $IrH_3[PR_3]_3$, $RhHCO[PR_3]_3$ and $RuHCl[PR_3]_3$ where R is an alkyl, and cycloalkyl, an aryl, and combinations thereof having from 1 to 12 carbon atoms.

To any conventional reaction vessel, container, or the like, is generally added a system medium such as benzene and other aromatic carbons as well known to one skilled in the art. The polymers may then be added if not already contained in the medium. Of course, care is taken so that the medium in polymer is free from moisture alcohols, acids and other active hydrogen compounds, and if not, the reaction vessel may be purged with an inert gas. The catalyst is then added under dry conditions such as with nitrogen. Generally, it is desirable especially for ruthenium, that the amount of moisture or active hydrogen be less than 20 parts per million. Hydrogen is then generally added to the reaction vessel with selective hydrogenation ensuing. The pressure in the reaction vessel for selective hydrogenation may generally range from about 0.5 to about 100 atmospheres with a preferred range being from 1.0 to about 2 or 3 atmospheres. The temperature range may vary from about 25° C to about 100° C with a preferred range being at a lower end such as less than 50° C. Generally, the reaction may be carried out at ambient temperatures such as about 25° C to about 30° C. High temperatures such as at times above 50° C and generally above 100° C are avoided since selective hydrogenation is usually lost.

As previously noted, a hydrogenation tends to be largely selective in that external or non-backbone unsaturated sites such as vinyl, vinylidene and the like are converted. Although the exact reason for this is not known, it is generally thought that such external sites from a steric standpoint are more readily available or, in other words, the unsaturated points on the polymer backbone are sterically hindered. The effect of selective hydrogenation in polymers or copolymers which are formed from butadiene monomers is to reduce the percent of 1,2-butadiene units.

Polymers selectively hydrogenated according to the present invention tend to show improved ozone resistance as well as improved oxidative stability since generally, the potentially available oxidative sites have been reduced. Of course, the polymers of the present invention may be used in their conventional manner which generally relate to uses as rubbers, especially for tire treads and tire cores.

The invention will be better understood by reference to the following examples and data.

EXAMPLE I

To a solution of commercially available polybutadiene (diene-35NFA, manufactured by Firestone, 10 grams) in 500 ml of dry toluene in a 28 oz. beverage bottle was added 0.5 grams of the below-identified catalysts under nitrogen. The solution was then flushed with hydrogen. The hydrogenation was carried out at 25° C with magnetic stirring under two atmospheres of hydrogen for approximately three hours. The yellow solution was then poured into excess methanol containing hydrochloric acid and a conventional antioxidant. The polymer obtained was dried at 50° C under a house vacuum of approximately 50 mm of mercury. The results obtained after partial hydrogenation are set forth in Table I.

TABLE I

| Example No. | CATALYSTS | INFRARED SPECTRA RESULTS | | | PMR $\%1,2$ | $C^{13}$ $\%1,2$ |
| --- | --- | --- | --- | --- | --- | --- |
| | | Cis-1,4 | Trans-1,4 | 1,2(vinyl) | | |
| Control | — | 39.6 | 49.5 | 10.8 | 11.3 | — |
| 1 | A | 36.5 | 50.7 | 2.4 | 2.5 | 3 |
| 2 | A | 35.2 | 61.6 | 3.1 | 2.5 | 3 |
| 3 | A | 35.3 | 63.9 | 2.8 | — | 4 |
| 4 | B | 35.6 | 52.0 | 8.5 | 8.2 | — |

A: $RhHCO[Pphenyl_3]_3$
B: $RuHCl[PPh_3]_3$

As readily apparent from Table I, the amount of 1,2butadiene groups in the polymer was significantly reduced according to infrared spectra testing. Similarly, the PMR (proton nuclear magnetic resonance) test also indicated a close correlation of 1,2-butadiene groups as did carbon-13 tests (nuclear magnetic resonance spectrometer).

EXAMPLE II

A one-gallon stainless steel reactor equipped with a temperature-controlling device, a stirrer and exit ports for sampling was used for the hydrogenation of the polymers.

The reactor was charged with a solution of butadiene in toluene (8 percent, 2.71) and 2.78 mM of n-butyl lithium. The polymerization was carried out at 55° C for 90 minutes, and then 3 mM of methanol was added into the reactor to deactivate the active lithium species. To the polymer solution was charged a catalyst solution in toluene. The hydrogenation was carried out at 40° ± 5° C under 10 atmospheres of hydrogen for 18 hours. The partially hydrogenated polymer was coagulated with a large amount of isopropanol containing hydrochloric acid and antioxidant and was dried at 50° C under vacuum. The results are summarized in Table II.

TABLE II

| EXAMPLE NO. | CATALYSTS | CIS-1,4 | TRANS-1,4 | 1,2(VINYL) | TOTAL FOUND | % 1,2 NMR | DSV | GEL % |
|---|---|---|---|---|---|---|---|---|
| 5 | — | 34.9 | 50.3 | 14.8 | 95.0 | 15.7 | 1.93 | 0.0 |
| 6 | A | 29.9 | 69.9 | 0.2 | 67.7 | 0 | 2.05 | 0.00 |
| 7 | — | 34.6 | 51.0 | 14.4 | 94.4 | 15.9 | 2.01 | 2.26 |
| 8 | A | 31.8 | 63.1 | 5.1 | 81.5 | 6 | 2.15 | 2.06 |
| 9 | — | 34.3 | 51.1 | 14.4 | 93.9 | 15.3 | 2.05 | 0 |
| 10 | B | 31.0 | 68.9 | 0 | 84.0 | 0 | 2.11 | 0 |

A: $RhHCO[PPh_3]_3$
B: $RuHCl[Pphenyl_3]_3$

While in accordance with the patent statutes preferred embodiments have been illustrated and described in detail, it is to be understood that the invention is not limited thereto, the scope of the invention being measured solely by the scope of the attached claims.

What is claimed is:

1. A process for the selective hydrogenation of unsaturated hydrocarbon polymers comprising the steps of;
adding an unsaturated hydrocarbon polymer to a vessel,
said hydrocarbon polymer made from unsaturated monomers having from 3 to about 12 carbon atoms,
said monomers selected from the class consisting of dienes and alkynes,
adding hydrogen to said vessel;
adding from about 0.5 to about 10.0 millimoles per 100 grams of polymer of a catalytic compound selected from the group consisting of $RhCl[PPh_3]_3$, $RhClCO[PPh_3]_2$, $RhHCO[PPh_3]_3$, $RuHCl[PPh_3]_3$, and $IrH_3[PPh_3]_3$ said catalytic compound selectively hydrogenating pendant points of unsaturation on said hydrocarbon polymer.

2. A process for the selective hydrogenation of unsaturated hydrocarbon polymers according to claim 1, wherein said catalytic compounds are selected from the group consisting of $RhHCO[Pphenyl_3]_3$ and $RuHCl[Pphenyl_3]_3$.

3. A process for the selective hydrogenation of unsaturated hydrocarbon polymers according to claim 1, wherein said hydrocarbon polymer is made from unsaturated monomers having from 3 to about 8 carbon atoms.

4. A process for the selective hydrogenation of unsaturated hydrocarbon polymers according to claim 1, wherein said hydrocarbon polymer is made from unsaturated monomers having from 3 to about 5 carbon atoms.

5. A process for the selective hydrogenation of unsaturated hydrocarbon polymers according to claim 1, wherein said polymers have a molecular weight range of from about 1,000 to about 500,000.

6. A process for the selective hydrogenation of unsaturated hydrocarbon polymers according to claim 5, wherein said monomers are selected from the group consisting of 1,3-butadiene; isoprene, 2,3-dimethyl-1,3-butadiene; phenyl-1,3-butadiene; piperylene; 2-methyl-1,3-pentadiene, 1,5-hexadiene; 3,4-dimethyl 1,5-hexadiene; 1,5-heptadiene; 1,4-octadiene; 4,5-diethyl-1,3-octadiene, 3-butyl-1,3-octadiene; acetylene; 1,5-hexadiyne and 2,4-hexadiyne.

7. A process for the selective hydrogenation of unsaturated carbon polymers according to claim 6, including additional monomers selected from the class consisting of 1,3-butadiene; isoprene; piperylene and copolymers made from monomers selected from the class consisting of butadiene-isoprene; butadiene-propylene; butadiene-ethylene; isoprene-styrene, alpha methyl styrene-butadiene and styrene-butadiene.

8. A process for the selective hydrogenation of unsaturated hydrocarbon polymers according to claim 5, wherein said monomers are selected from the class consisting of 1,3-butadiene; and isoprene and from the copolymer styrene-butadiene.

9. A process for the selective hydrogenation of unsaturated hydrocarbon polymers according to claim 5, wherein said vessel is purged with an inert gas before the addition of said hydrogen.

10. A process for the selective hydrogenation of unsaturated hydrocarbon polymers according to claim 7, wherein said catalysts ranges from about 0.75 to about 1.75 millimoles per 100 grams of polymer.

11. A process for the selective hydrogenation of unsaturated hydrocarbon polymers, according to claim 7, wherein said hydrogenation is carried out at a temperature range of from about 25° C to about 100° C.

12. A process for the selective hydrogenation of unsaturated hydrocarbon polymers according to claim 11 wherein said temperature is from about 25° C to about 50° C.

13. A process for the selective hydrogenation of unsaturated hydrocarbon polymers according to claim 11, wherein said hydrogenation is carried out in a pressure of from about 0.5 to about 100 atmospheres.

14. A process for the selective hydrogenation of unsaturated hydrocarbon polymers according to claim 13, wherein said pressure ranges from about 1.0 to about 3.0 atmospheres.

15. A process for the selective hydrogenation of unsaturated hydrocarbon polymers according to claim 8, wherein said catalysts range from about 0.75 to about 1.75 moles per 100 grams of polymer.

16. A process for the selective hydrogenation of unsaturated hydrocarbon polymers according to claim 10, wherein said catalysts are selected from the group consisting of $RhHCO[Pphenyl_3]_3$ and $RuHCl[Pphenyl_3]_3$.

17. A process for the selective hydrogenation of unsaturated hydrocarbon polymers according to claim 15, wherein said catalysts are selected from the group consisting of $RhHCO[Pphenyl_3]_3$ and $RuHCl[Pphenyl_3]_3$.

18. A process for the selective hydrogenation of unsaturated hydrocarbon polymers according to claim 16, wherein said molecular weight ranges from about 100,000 to about 150,000.

19. A process for the selective hydrogenation of unsaturated hydrocarbon polymers according to claim 17, wherein said molecular weight ranges from about 100,000 to about 150,000.

* * * * *

UNITED STATES PATENT OFFICE
CERTIFICATE OF CORRECTION

Patent No. 3,993,855      Dated November 23, 1976

Inventor(s) Jung Wong Kang

It is certified that error appears in the above-identified patent and that said Letters Patent are hereby corrected as shown below:

In Line 6 of the Abstract, "resin" should read --chain--.

Signed and Sealed this

First Day of March 1977

[SEAL]

*Attest:*

RUTH C. MASON
*Attesting Officer*

C. MARSHALL DANN
*Commissioner of Patents and Trademarks*